United States Patent [19]

Kneidinger

[11] Patent Number: 4,781,579

[45] Date of Patent: Nov. 1, 1988

[54] PROCESS FOR CHANGING THE COLOR OF PARTIAL AREAS OF THE SURFACE OF PIGMENTED HYDRAULICALLY BONDED CONSTRUCTION ELEMENTS

[76] Inventor: Walter Kneidinger, 4121 Altenfelden, Doppl 10, Austria

[21] Appl. No.: 71,545

[22] Filed: Jul. 7, 1987

Related U.S. Application Data

[63] Continuation of Ser. No. 813,636, Dec. 24, 1985, abandoned.

[30] Foreign Application Priority Data

Dec. 27, 1984 [AT] Austria ................................ 4113/84

[51] Int. Cl.$^4$ ................................................ F27D 5/00
[52] U.S. Cl. ........................................ 432/10; 432/13; 432/225; 264/62; 52/311
[58] Field of Search .............. 432/222, 229, 225, 226, 432/10, 13; 52/311; 264/60, 62

[56] References Cited

U.S. PATENT DOCUMENTS

| | | | |
|---|---|---|---|
| 1,463,961 | 8/1923 | Ledeboer | 52/311 |
| 1,891,479 | 12/1932 | Norton | 52/311 |
| 2,106,317 | 1/1938 | Dezendorf | 52/311 |
| 2,902,739 | 9/1959 | Foster | 52/311 |
| 3,196,193 | 7/1965 | Davies | 264/62 |
| 3,230,283 | 1/1966 | Hughes | 264/62 |
| 4,334,858 | 6/1982 | Iiyama et al. | 432/10 |

FOREIGN PATENT DOCUMENTS 655798 4/1979 U.S.S.R. ............................. 432/225

*Primary Examiner*—Henry C. Yuen
*Attorney, Agent, or Firm*—Browdy and Neimark

[57] ABSTRACT

A process for changing the color of partial surface areas of pigmented, hydraulically bonded construction elements by application of high temperatures thereon, wherein the said partial surface areas are subjected to temperatures of at least 1,000° C., until the desired change in coloration has been achieved.

5 Claims, No Drawings

PROCESS FOR CHANGING THE COLOR OF PARTIAL AREAS OF THE SURFACE OF PIGMENTED HYDRAULICALLY BONDED CONSTRUCTION ELEMENTS

This application is a continuation of application Ser. No. 813,636 filed Dec. 24, 1985 now abandoned.

FIELD OF THE INVENTION

The present invention relates to a process for changing the color of partial surface areas of pigmented, hydraulically bonded construction elements.

BACKGROUND OF THE INVENTION

The concrete that is used in foundation work and above ground suffers from increasingly serious problems connected with visual impact and aesthetics, and the impact on the landscape as well as the demands placed on architectural considerations by the monotonous gray areas presented by such structures are without doubt important underlying reasons for this state of affairs.

Subsequent coloring by surface coating is shortlived and entails repetitive maintenance costs; in cases of year-round weathering and in extreme cases of mechanical loads, such as in the case of compound plaster, this is usually not an acceptable solution.

All of the foregoing constitute grounds for adopting the design solution of coloring concrete in bulk, thereby producing a coloring effect that will last throughout the lifetime of the product. In the case of technically rational production, however, one is confined to producing concrete in a single-color mixture or, at best, to achieving a barely controllable marbling effect by mixing in various colors.

SUMMARY OF THE INVENTION

It has now been found that one can open a formerly unknown spectrum of new coloring possibilities by later heat treating of pigmented, hydraulically bonded construction elements. The present invention relates to a process of changing the color of partial surface areas of pigmented, hydraulically bonded construction elements by means of subjecting them to increased temperatures, characterized in that the said parts of the surface are subjected to temperatures of at least 1,000° C. until such time as the desired change in the color has taken place.

From Austrian Patent No. 90 059 it is known to create changes in coloration of articles made from cement, concrete, reinforced concrete or lime strass by applying metal salt solutions to their surfaces and then to heat the covering surfaces thus created.

By means of this the salts are changed into oxides, however this causes the freeing of anions of acid which have extremely unwanted results on the surrounding areas of the construction element.

In accordance with the present invention pigmented construction elements are treated and, in the course of this treatment oxide pigments are changed to different crystalline or molecular structures, thereby changing color without giving off anions.

A method is described in German Patent No. 649 075 in which limestone, containing iron oxide hydrate is heated to a temperature of up to 350° C. during long period of time of up to 30 hours. Utilizing such low temperatures in hydrate-bonded pigmented construction elements does not provide satisfactory results, aside from the disadvantage of long treatment times. On the other hand, the high temperatures required by the present invention cannot be used with limestone, since they would result in calcination of the limestone and formation of CaO.

In connection with brick-making it was suggested in U.S. Pat. No. 2,902,739, to apply, before baking, to a brick or other clay form a coating consisting of a liquid carrier material, a metallic compound and a small amount of coloring agent and then to bake the brick.

Aside from the different base material, the method in accordance with the present invention is basically different from the method in U.S. Pat. No. 2,902,739, in which changes in coloration are achieved by chemical reaction, for which purpose foreign substances are added.

The present invention makes it possible for the first time instead of simply creating a pigment of another color, to create planned, artistically multi-colored surface designs in the substance itself that is used for the structural elements, without any additional application of color coating. It has been found, furthermore, that coloring effects can be achieved in the bonding concrete which were hitherto unknown on the pigment alone, or which could not have been achieved by simply mixing the same quantity of pigment into the concrete.

Also, it could not be foreseen from the outset how the pigments would behave in hydraulic and/or carbonate bonding, or whether the necessary heat treatment would not impair the structure of the construction material as, in the normal course of events, special refractory concretes are to be used for special temperature conditions.

DETAILED DESCRIPTION OF THE INVENTION

If an oxy-acetylene torch flame is directed to concrete that has been colored with yellow iron oxide, within the flame core one can quite soon see an area in which the concrete displays the characteristics of fusion; this area is followed by a black area, then by a yellowish-white phase, again followed by black, then red, and finally by the original yellow. The concentric arrangement of these color areas around the centerpoint of the flame indicates that these color effects are temperature-dependent and also whether the surface so treated lies in the oxidizing or in the reducing areas of the flame. The effect that is desired can be made more or less pronounced by using the appropriate temperatures, that is, by burner control. Additional control over the depth into which the coloration penetrates into the structural element can be exerted by the duration of the temperature effect. In addition to aesthetic criteria, the important advantage of this color formation lies in the fact that it cannot separate from a base of different kind, as this is the case with application to a bonding agent.

A multicolor surface formation also entails the additional advantage that undesired color shadings, as they often occur as a result of the effects of separating agents, of vibration, and of variations in the water:cement ratio, are concealed on uni-colored surfaces.

Subsequent concrete treatment in the sense of surface protection can be applied at little cost and with no coloration, in the form of surface sealants or dirt-repellant waterproofing.

The selection of pigments and mixtures of pigments that match with regard to their sensitivity to temperature—for reasons of cost, usually iron oxide—results in attractive possibilities of surface formation, be this in the way of surface shading or according to any desired scheme of ornamentation. In this regard, an individual character can be imparted to mass-produced elements, or stencils can be used to give a uniform appearance to such elements.

Electrical resistance heating, directly fastened to the construction element, lends itself to generate the temperature, with the heaters attached directly to the structural element so as to allow any sort of graphic structures. The most efficient radiation temperature of such resistance heaters or heating wire alloy lies around 1,250 to 1,400 K.

Changes in coloration are also possible by using sufficiently heated air, particularly gas-air or gas-oxygen flames. The relatively high temperatures make it possible to work fast and thus permit more superficial temperature stress in the interest of lower temperature stresses within the structural element. The possibility of varying the temperature by controlling the feed rate or the burner stand-off, as well as the reducing flame, extends the scope of the color scale that can be achieved.

The multi-colored ornamentation of the contrete surface can also be influenced by its shape and contours, as on the one hand raised or depressed areas are subjected to different temperature stresses, and on the other hand the depressed areas can be covered, with sand, for example, so that the effect of the temperature is confined to the exposed areas.

Of course, all other possibilities for applying sufficient temperature feed, such as are known, for example, from welding technology or pyrotechnics, can also be used.

The present invention is further explained by the following examples:

EXAMPLE 1

A heating wire from an electrical radiant heater is applied to a cement mortar sample colored with 5% yellow iron oxide (relative to the weight of cement), and then heated for 1–5 minutes until red hot. This will result in a red stripe on the contact surface of the yellow colored concrete.

EXAMPLE 2

The flame of an autogenous welding torch is directed to a concrete sample colored with 5% red iron oxide. Black and yellowish-white recoloration is achieved by varying the distance between the torch and the surface of the concrete, and/or by varying the time the torch is applied onto the same place.

EXAMPLE 3

A concrete sample colored with 5% black iron oxide is heated with a gas torch, as in Example 2. This will generate a yellow-white color that becomes black as the heat is increased, with the black being much deeper and stronger than the original color.

EXAMPLE 4

A concrete mixture colored with 5% yellow iron oxide is hardened on an air-cushion wrapping foil serving as shuttering. The resulting negative impression displays depressions which are covered with sand after the piece has been placed in a horizontal position. When treated with an oxy-acetylene torch only the raised areas between the covered depressions are colored as desired.

EXAMPLE 5

An electric resistance heating conductor is applied to a cement mortar sample colored with 5% yellow iron oxide. In the contact area the color changes from yellow to red after a short period of action.

I claim:

1. A process for changing the color of partial surface areas as hydraulically bonded constructions elements comprising:
    forming a concrete matrix including a pigment incorporated in said matrix;
    hydraulically bonding said concrete matrix; and
    applying heat of at least 1000° C. to the surface of said bonded matrix to develop color in the surface areas of the matrix where the heat has been applied.

2. The process of claim 1 wherein the heat is generated by a gas-oxygen flame.

3. The process of claim 1 wherein the partial surface areas are heated to white heat.

4. The process of claim 1 wherein the partial surface areas are heated to just short of the melting point of said partial surface areas.

5. The process of claim 1 wherein the partial surface areas are heated for up to five minutes.

* * * * *